July 24, 1923.
G. B. N. DOW ET AL
ANTISKID CHAIN HOOK
Filed Nov. 21, 1922
1,463,071
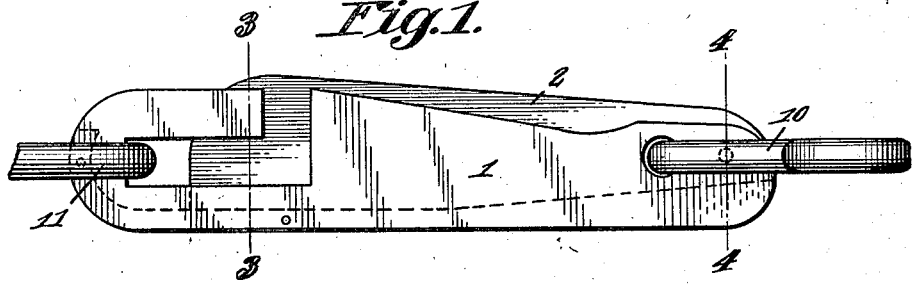
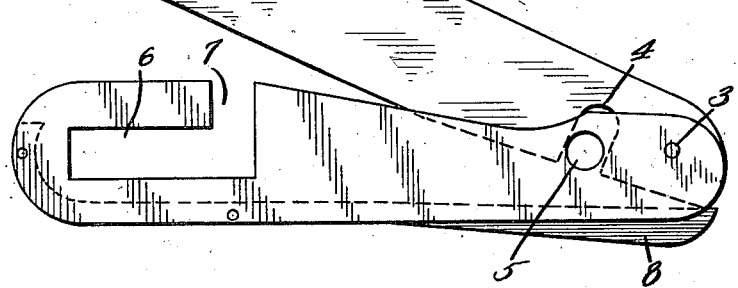
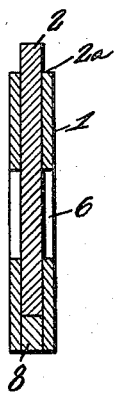
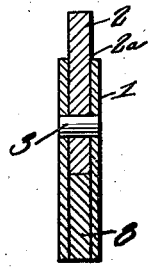
G.B.N.Dow AND
F.P.Ham
Inventor
By C.A.Snow&Co.
Attorneys Patented July 24, 1923.

1,463,071

UNITED STATES PATENT OFFICE.

GEORGE B. N. DOW AND FRANK P. HAM, OF MANCHESTER, NEW HAMPSHIRE, ASSIGNORS TO GEORGE J. CLARKE, OF WEST HANOVER, MASSACHUSETTS.

ANTISKID-CHAIN HOOK.

Application filed November 21, 1922. Serial No. 602,370.

*To all whom it may concern:*

Be it known that we, GEORGE B. N. Dow and FRANK P. HAM, citizens of the United States, residing at Manchester, in the county of Hillsboro and State of New Hampshire, have invented a new and useful Antiskid-Chain Hook, of which the following is a specification.

This invention relates to hooks for connecting ends of chains or the like, and more particularly for hooks used in connecting the ends of anti-skid chains.

The object of the invention is the provision of a simple and efficient device of this character operable in a manner similar to a jack knife and in which it is impossible for the device to become loose until manually operated to disengage the hook from the chain.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a hook constructed in accordance with this invention and shown applied and in operative closed position.

Fig. 2 is a similar view of the hook detached and shown in open position.

Fig. 3 is a transverse section taken on the line 3—3 of Fig. 1, and

Fig. 4 is a similar view taken on the line 4—4 of Fig. 1.

In the embodiment illustrated, the hook constituting this invention comprises a body member 1 similar to the body of a jack knife having a cooperating lock member 2 in the form of a blade pivoted at 3 in a pocket formed in the body 1. This blade 2 has a notch or recess 4 opening through the inner edge thereof and positioned adjacent its pivotal connection with the body. The body 1 has registering apertures 5 in the opposed walls of its blade receiving pocket and which are designed to register with the notch 4 in the blade when the latter is in closed position.

A chain link 10 is designed to be connected with the body 1 by passing said link through the registering apertures 5 with the link straddling the end of the body and with which the recess 4 is designed to engage when the blade is in closed position.

The body 1 is provided at its front end with an L-shaped recess 6 to detachably receive a link 11 at the free end of the chain, it being understood that the link 10 is permanently connected with the hook. The short arm 7 of the recess 6 opens through the upper edge in which the blade receiving pocket $2^a$ is formed as is shown clearly in Figs. 1 and 2. When the blade 2 has been closed as shown in Fig. 1, the link 11 will be held engaged with the hook body 1 and can not be removed until said blade is opened and which is held in closed position by the strain exerted by the pull on chain link 10, the connection of which is in longitudinal alinement with the pivotal connection 3 of the blade.

A spring 8 is mounted in the edge of the body 1 opposite the pocket therein and is designed to bear against the pivoted rear end of the blade 2 to hold it yieldably in closed position and to close it after it has been opened.

To remove the chain from the hook, it is necessary to open the blade 2 sufficient to permit the link 11 to pass out through the short arm 7 of the recess 6.

The security with which the ends of a chain may be removably connected together by this device makes the device practically adapted for use in positioning anti-skid chains on automobile wheels, although it is equally useful in connecting any kind of flexible elements.

We claim:—

1. A device of the class described comprising a body member having a longitudinally extending pocket in one edge thereof and an outwardly yielding spring in the other edge, said body having an L-shaped recess at one end thereof with the short arm opening through said pocket and adapted to receive a chain link, a blade pivotally mounted at one end in said pocket and adapted to close said L-shaped recess and normally held closed by said spring, and cooperating means carried by said blade and body for the reception of a chain link whereby the blade is held in closed position by the link when the device is in use.

2. A hook of the class described comprising a linked body member having an L-shaped recess in one end with the short arm opening through one edge of said body, said body having a pocket in the recessed edge thereof, a blade pivotally mounted at one end in the end of the pocket opposite to that having the recess, said blade having a notch in its inner edge adjacent the walls of said pocket having registering apertures to register with the notch in the blade when the latter is in closed position.

In testimony that we claim the foregoing as our own, we have hereto affixed our signatures.

GEORGE B. N. DOW.
FRANK P. HAM.